United States Patent
LeBoulzec (12) 
(10) Patent No.: US 6,542,594 B1
(45) Date of Patent: Apr. 1, 2003

(54) METHOD FOR THE MANAGEMENT OF AN AUTOMATIC BRANCH EXCHANGE WITH THE CREATION OF A TABLE OF USERS, AND CORRESPONDING AUTOMATIC BRANCH EXCHANGE

(75) Inventor: Didier LeBoulzec, Thorigne Fouillard (FR)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/454,648

(22) Filed: Dec. 6, 1999

(30) Foreign Application Priority Data

Dec. 10, 1998 (EP) ............................................ 98460056

(51) Int. Cl.⁷ .......................... H04M 3/42; H04M 7/00; H04M 3/00; G06F 17/30
(52) U.S. Cl. ............. 379/201.03; 379/230; 379/265.02; 707/10
(58) Field of Search ........................... 379/230, 265.02; 707/10

(56) References Cited

U.S. PATENT DOCUMENTS

| | | | |
|---|---|---|---|
| 4,956,861 A | 9/1990 | Kondo | 379/142 |
| 5,392,346 A | 2/1995 | Hassler | 379/265 |
| 5,563,940 A | 10/1996 | Tsuzuki et al. | 379/233 |
| 5,991,390 A | * 11/1999 | Booton | |
| 6,131,095 A | * 10/2000 | Low et al. | |
| 6,246,758 B1 | * 6/2001 | Low et al. | |
| 6,282,281 B1 | * 8/2001 | Low | |

FOREIGN PATENT DOCUMENTS

| | | | |
|---|---|---|---|
| WO | WO 97/34401 | 9/1997 | H04M/1/64 |
| WO | WO 97/38518 | 10/1997 | H04M/3/42 |
| WO | WO 97/50234 | 12/1997 | H04M/3/46 |

OTHER PUBLICATIONS

European Search Report, May 7, 1999, 98460056.I.9–2209.

* cited by examiner

Primary Examiner—Ahmad F. Matar
Assistant Examiner—Thjuan P. Knowlin
(74) Attorney, Agent, or Firm—David Volejnicek (57) ABSTRACT

A method for the management of an automatic branch exchange of the type interacting with a plurality of users by means of a plurality of user terminals comprises the following steps:
- the identification of each of said users by at least one user identifier; and
- the creation of a table of users (1), associating a user profile with said at least one user identifier of each user, each user profile comprising at least one attribute assigned to said user and especially a set of user terminals that is possibly vacant. The interaction between said automatic branch exchange and each user takes place as a function of the user profile associated with said user.

22 Claims, 5 Drawing Sheets

| TERMINAL | | TERMINAL PROFILE | |
|---|---|---|---|
| IDENTIFIER: | | TERMINAL ATTRIBUTE: | |
| TERMINAL NUMBER | TERMINAL NAME | SET of USERS USING THE TERMINAL | KEY PROGRAMMING MODE |
| 5 | Office 1 | User nº 51 (Jean) | mode x |
| 6 | Office 2 | User nº 52 (Pascal) | mode y |
| 7 | Meeting room | Users nº 51 (Jean), 52 (Pascal) and 54 (Laurent) | mode x |
| 8 | Cordless | User nº 52 (Pascal) | mode z |
| 9 | Secretariat | Users nº 54 (Laurent) and 55 (Simon) | mode x |
| .... | .... | .... | .... |
| | | | |
| | | | |

| TERMINAL IDENTIFIER (= USER) | | TERMINAL PROFILE | | | |
|---|---|---|---|---|---|
| | | TERMINAL ATTRIBUTE | | | |
| TERMINAL NUMBER | TERMINAL NAME (= NAME OF THE TERMINAL USER) | DDI N° | REROUTING PATH | RINGING | KEY PROGRAMMING MODE |
| 1 | Marc | (2) 99 34 56 78 | Path n° 1 | Ringing a | mode x |
| 2 | Pierre | (NONE) | Path n° 2 | Ringing a | mode y |
| 3 | Luc | (2) 99 34 56 79 | Path n° 3 | Ringing b | mode x |
| ... | ... | ... | ... | ... | ... |

FIG. 2

| USER IDENTIFIER | | USER PROFILE | | | | | | |
|---|---|---|---|---|---|---|---|---|
| | | USER ATTRIBUTE | | | | | | |
| USER N° | USER NAME | SET OF TERMINALS USED BY THE USER | DDI N° | REROUTING PATH | RINGING | RIGHTS | PASS-WORD | LANGUAGE |
| 51 | Jean | terminal n° 5 | (2) 99 87 65 66 | Path n° 5 | Ringing a | Set A | 9876 | French |
| 52 | Pascal | terminal n° 6,7 & 8 | (None) | Path n° 6 | Ringing a | Set A | 4834 | English |
| 53 | Thierry | (None) | (2) 99 33 33 34 | Path n° 7 | Ringing b | Set B | (None) | French |
| 54 | Laurent | terminal n° 9 | (2) 99 33 33 35 | Path n° 8 | Ringing c | Set C | 5278 | French |
| 55 | Simon | terminal n° 9 | (2) 99 33 33 36 | Path n° 9 | Ringing a | Set C | 6111 | English |
| ... | ... | ... | ... | ... | ... | ... | ... | ... |

FIG. 3

| TERMINAL IDENTIFIER: | | | TERMINAL PROFILE | |
|---|---|---|---|---|
| TERMINAL NUMBER | TERMINAL NAME | | TERMINAL ATTRIBUTE: | |
| | | | SET of USERS USING THE TERMINAL | KEY PROGRAMMING MODE |
| 5 | Office 1 | | User n° 51 (Jean) | mode x |
| 6 | Office 2 | | User n° 52 (Pascal) | mode y |
| 7 | Meeting room | | Users n° 51 (Jean), 52 (Pascal) and 54 (Laurent) | mode x |
| 8 | Cordless | | User n° 52 (Pascal) | mode z |
| 9 | Secretariat | | Users n° 54 (Laurent) and 55 (Simon) | mode x |
| ... | ... | | ... | ... |

METHOD FOR THE MANAGEMENT OF AN AUTOMATIC BRANCH EXCHANGE WITH THE CREATION OF A TABLE OF USERS, AND CORRESPONDING AUTOMATIC BRANCH EXCHANGE

CROSS-REFERENCE TO RELATED APPLICATION

This application claims priority of European Patent Application No. 98460056.9, which was filed on Dec. 10, 1998.

TECHNICAL FIELD

The field of the invention is that of automatic branch exchanges for telecommunication systems and especially but not exclusively private automatic branch exchanges or PBX.

More specifically, the invention relates to a method for the management of an automatic branch exchange.

BACKGROUND OF THE INVENTION

In general, a computer interacts with a plurality of users by means of a plurality of user terminals. Typically, these terminals are distributed geographically within the premises of a firm. In general, it is possible to distinguish between two types of user terminals, namely "internal" user terminals which are directly connected to a switch and "external" user terminals, connected to the automatic branch exchange by means of a bus or a telephone network line (STN, ISDN, etc.).

In the present description, the term <<user terminal>> is understood to mean any type of telecommunication equipment placed at the disposal of users such as especially but not exclusively telephone type terminals (for example telephone sets) and computer type terminals (for example microcomputers). With a view to simplification, the expression "user terminal" is sometimes replaced by "terminal".

Conventionally, the management of an automatic branch exchange is based solely on the notion of a user terminal. It is assumed indeed that only one terminal is assigned to each user, thus enabling the routine identification of the user with his single terminal. Thus typically, each user terminal is in a distinct office (or working area), and it is assumed that this user terminal is used by the person working in this office (or within this working area).

Conventionally, the automatic branch exchange identifies each user terminal by means of one or more identifiers, and each user terminal is assigned a physical location (or port) on an input/output plan of the automatic branch exchange. Owing to the routine identification of the user with his unique terminal, each user terminal is generally identified by a pair of user terminal identifiers of the type <<(terminal number, name of user using the terminal)>>.

Figure 1:
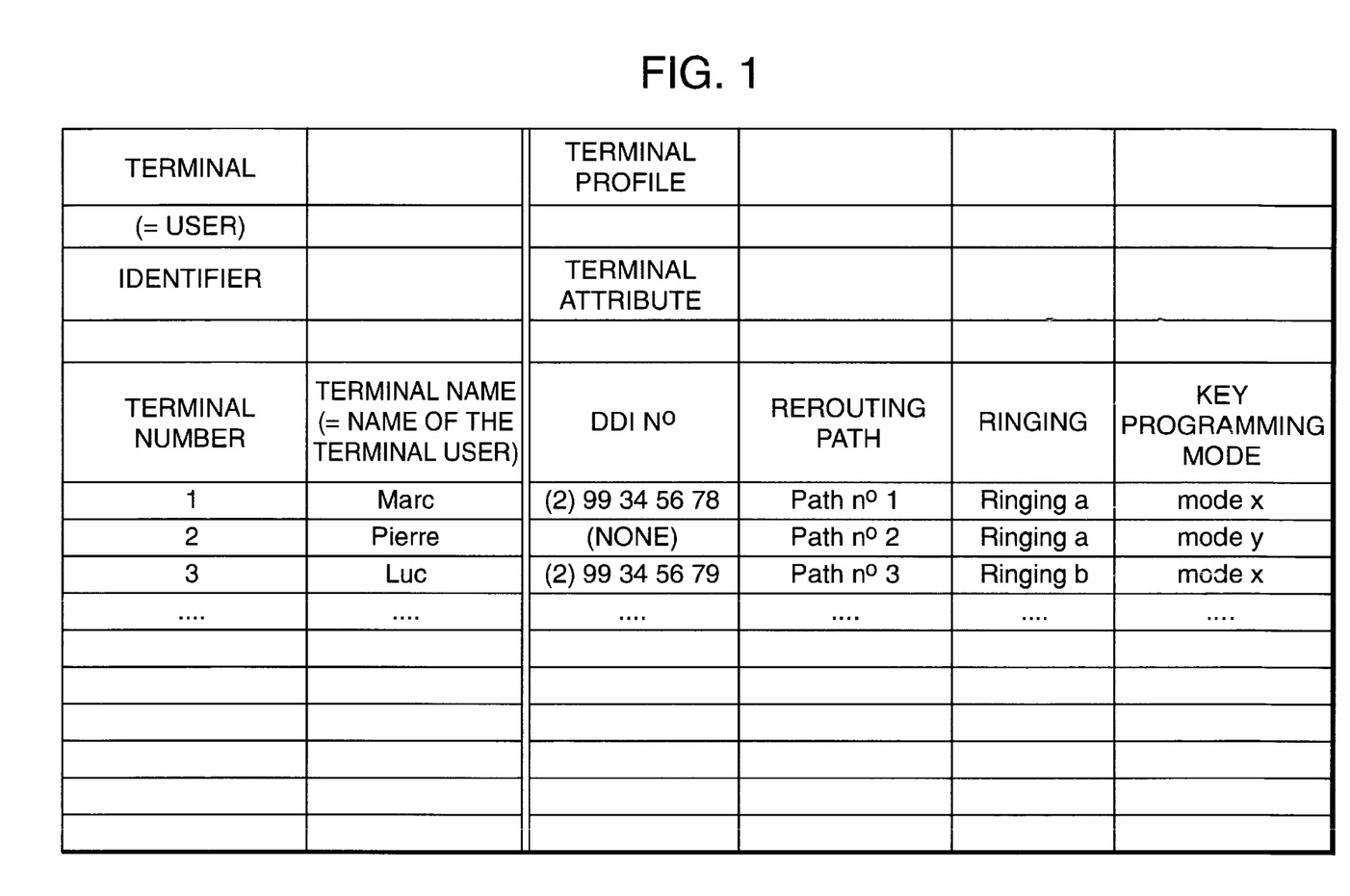
FIG. 1 shows an exemplary table of terminals created with a prior art method for the management of an automatic branch exchange.

Furthermore, the automatic branch exchange has a table of user terminals associating a user terminal profile with each pair of identifiers of a user terminal (namely each user terminal). FIG. 1 shows an example of a table of terminals of this kind created with a prior art method of management of an automatic branch exchange. Each user terminal profile has a plurality of attributes assigned to the user terminal such as for example a DDI (direct dialing inward) number, a rerouting path, a ringing, a mode of programming the keypad of the user terminal, etc. The interaction between the automatic branch exchange and a given user terminal is done as a function of the profile of the user terminal of this given user terminal.

The present method of management of an automatic branch exchange therefore in no way incorporates the way in which the users, who are human persons, use the user terminals, which are physical items of equipment. Consequently, the present method of management of an automatic branch exchange has numerous drawbacks.

First of all, it is now increasingly frequent to assign to one and the same user, known as a multiple user, several user terminals such as for example a standard wired phone or a cordless phone. Now the present method of management of an automatic branch exchange is not at all suited to such multiple users since its basic principle consists of the routine identification of a single terminal with the user. Consequently, the present solution for managing the case of a multiple user consists in assigning a distinct terminal number to each of the user terminals of the multiple user and in recording these numbers separately in a user terminal table (in associating a user terminal profile with each one). This operation is fairly cumbersome since it requires the definition of a plurality of user terminal profiles, although they are highly (even entirely) similar as they pertain to one and the same user. To contact a multiple user internally (namely from a terminal managed by the automatic branch exchange), this approach implies the knowledge, by the calling party, of the numbers of the different terminals of this user. Similarly, to convey an external call (namely one made from a terminal not managed by the automatic branch exchange) to a multiple user, this approach implies the preliminary definition of an entity with a higher logic level, namely a group of user terminals (or <<group of users>> since each user terminal is in principle assigned to a distinct user) which in the present case brings together all the terminals assigned to the multiple user. Within this group of user terminals, either a group rerouting path is defined or each terminal has its own rerouting path.

Furthermore, the concept of virtual users is at present costly to implement in terms of material resources. It may be recalled that a user is said to be <<virtual>> if, despite the fact that he has no user terminal assigned to him (and therefore cannot send any call through the automatic branch exchange), he has some of the resources managed by the automatic branch exchange (for example a DDI number, a rerouting path, a voice message mailbox, etc.). As explained here above, these resources correspond to the attributes included in the user terminal profile. Consequently, to define a virtual user, it is necessary to have a user terminal profile available. Now, to have a user terminal profile available, it is imperatively necessary to have identified a user terminal (even if it does not exist in reality) with the automatic branch exchange and to have it assigned a physical port on an input/output board of the automatic branch exchange. In short, with the present method of management of an automatic branch exchange, a physical port of the board is blocked unnecessarily for each virtual user. This is all the more troublesome as the input/output boards of the automatic branch exchange form a limited physical resource. Typically, each input/output board comprises 8, 16 or 32 ports (or physical locations).

Other drawbacks again appear when several users, known as common users, use one and the same user terminal. This situation corresponds for example to the case of a user terminal <<shared>> by two users working in one and the same room. Since the attributes used to customize the operation of the terminal are assigned to the terminal itself (and not to the users of this terminal), it is currently impossible in this case, before picking up the phone, to know which potential user is the intended receiver of a call. For the same reason, it is impossible to forward a call differently depending on the common user called.

Other drawbacks also appear when a third party user, called a multi-telephonist user, receives calls at a single terminal intended for these other different users. This situation corresponds for example to the case of a telephone operator in a medical practice, who receives calls at his terminal for two different doctors (i.e. a telephonist providing a customized telephone reception service for two distinct groups of medical clients). For the above-mentioned reason (i.e. that attributes are assigned to the terminal and not to the users), it is presently impossible in this case to modify the working of the unique terminal (for example the ringing, the rerouting of the call in the absence of the operator, etc.) according to the called user.

SUMMARY OF THE INVENTION

In particular, it is an object of the invention to overcome these different drawbacks of the prior art.

More specifically, one of the goals of the present invention is to provide a method for the management of an automatic branch exchange that can be used to provide a larger number of functions (or operational modes) to the users.

It is an aim of the invention also to provide a method of this type enabling an effective and simple response to the requirements of the different types of users, namely in particular, "standard users" (each having a unique user terminal), "multiple users" (each having several user terminals), "virtual users" (having no user terminal available), "common users" (sharing one or more user terminals), "multi-telephonists" (who receive calls intended for different other users), etc.

The aim of the present invention also is to provide an automatic branch exchange enabling the implementation of a method of this kind.

These different goals as well as others that shall appear hereinafter are achieved according to the invention by means of a method for the management of an automatic branch exchange of the type interacting with a plurality of users by means of a plurality of user terminals, said method comprising the following steps: the identification of each of said users by at least one user identifier, and the creation of a table of users, associating a user profile with said at least one user identifier of each user, each user profile comprising at least one attribute assigned to said user and especially a set of user terminals that is possibly vacant; the interaction between said automatic branch exchange and each user taking place as a function of the user profile associated with said user.

The main principle of the invention therefore consists in dissociating the notions of user and user terminal. It may be recalled that the current known method provides on the contrary for a deliberate and systematic confusion between these two notions (it assumes indeed that a unique terminal is assigned to each user).

Thus, the users form a new category of "communicators", on the same basis as the existing categories of "communicators" (especially such as user terminals and voice-message mailboxes). It may be recalled that the "communicators" are entities managed as such by the automatic branch exchange and put into communication by the automatic branch exchange during calls.

According to the present invention, the dissociation of the notion of user and user terminal is done through the association, within a table of users, of a user profile with each previously identified user. This user profile is essential because it comprises the attributes assigned to the user as a function of which the automatic branch exchange interacts with the user. Among the attributes of each user profile, there is especially a set of user terminals which, when it is not vacant, comprises one or more terminals on which the user can be called.

In other words, the invention provides for a new type of profile, namely the user profile, which is proper to the users (human persons) and not to the user terminals (physical equipment). The user profile therefore comprises attributes which hitherto were obligatorily included in the only existing profile, namely the user terminal profile.

As explained in detail hereinafter, the existence of this new user profile can coexist with a user terminal profile (reorganized as compared with the one that is known), comprising the attributes proper to the user terminal. It will be understood that the optimum solution consists in maximizing the number of attributes included in the user profile and hence in minimizing the number of attributes included in the user terminal profile.

It will be noted that the notion of a user according to the present invention is independent of the geographical location of the user. Indeed, to contact the user (i.e. placing a call), an attempt is made to notify him by means of a terminal which, on the basis of the user's profile, is assigned to him. This terminal can be located internally (directly connected to the automatic branch exchange) or externally (connected to the automatic branch exchange by a trunk). This is not important. The only condition is that the terminal should be listed as such by the automatic branch exchange.

Finally it must be noted that, in the present invention, the term "set of user terminals" is understood to mean a set of zero, one, or a plurality of user terminals as the case may be (even if "user terminals" is always written in the plural). This observation can also be applied to different expressions of the type "set of elements" appearing hereinafter in the description.

Preferably, said automatic branch exchange is a private automatic branch exchange. It is clear however that the present invention can also be applied to other types of automatic branch exchanges.

Advantageously, each user profile furthermore comprises at least one additional attribute belonging to the group comprising:

the sets of DDI numbers, which may possibly be vacant sets;

the rerouting paths, which may possibly be of a conditional type;

the sets of rings, which may possibly be vacant sets;

the sets of rights, which may possibly be vacant sets;

the passwords enabling an authentication;

the languages usable by said automatic branch exchange.

This list is in no way exhaustive.

Advantageously, said at least one user identifier belongs to the group comprising the user numbers and the user names. The user number is necessary to enable entry and/or display on terminals whose possibilities are limited (case of an analog terminal). When the number of users is small, the numbers may have the advantage of being short identifiers. The user name enables an improvement in the perception of the users (customization) and is an identification that is natural and easy to remember. These are unique identifiers: it is not permitted to have two users with the same identifier(s) (same user number or same user name). It may be planned that each of the two types of identifiers will be sufficient by itself to identify the user.

It is important not to mistake the user identifiers introduced by the present invention (namely for example the user numbers and the user names) for the already known user terminal identifiers (namely for example the terminal numbers and the terminal names).

Preferably, said users belong to the group comprising:

"standard users" whose profile includes a set of user terminals comprising a single user terminal;

"multiple users" whose profile includes a set of user terminals comprising at least two user terminals;

"virtual users" whose profile includes a vacant set of user terminals, namely a set comprising no user terminal.

Thus, the notion of a user profile makes it possible to easily meet the needs of all types of users (the above-mentioned list is not exhaustive). Indeed, by modifying the user attributes (and especially the contents of the set of terminals), it is possible to adapt the user profile to each particular situation.

Advantageously, for each call intended for one of said multiple users, said automatic branch exchange implements a predetermined call distribution strategy, enabling the distribution of said call among said at least two user terminals belonging to said set of user terminals included in the profile associated with said multiple user. This predetermined call distribution strategy advantageously belongs to the group comprising: simultaneous distribution, cyclical distribution, pseudo-cyclical sequential distribution, cumulative distribution etc.

Preferably, one and the same user terminal, called a shared terminal, may be included in different sets of user terminals, themselves included in at least two user profiles whose associated users are called <<common users>>. Thus, two (or more) users may share one (or more) terminal(s) while at the same time possessing distinct user profiles.

In this case, the user profile of each of said common users advantageously comprises at least one distinct attribute, called a differentiation attribute, preferably belonging to the group comprising: the user identifiers, the ringing, and the rerouting paths.

In one advantageous embodiment of the invention, said method furthermore comprises a step for the dynamic modification of said user profile. In this way, it is possible to meet the users' needs with the greatest possible efficiency. For example, all the terminals assigned to a user may be temporarily modified by a forwarding operation.

The step of dynamic modification of said user profile is advantageously done through a function accessible to at least one person belonging to the group comprising: the user associated with the user profile and the managers of said automatic branch exchange.

Preferably, said step of dynamic modification of said user profile consists of a choice of a user profile from a group of at least two predefined user profiles.

Thus, the change in user profile may be done easily, each predefined user profile being adapted to a particular situation.

In a particular embodiment of the invention, said method furthermore comprises the following steps:

the identification of each of said user terminals by at least one user terminal identifier;

the creation of a table of user terminals, associating a user terminal profile with said at least one user terminal identifier of each user terminal, each user terminal profile comprising at least one attribute assigned to said user terminal and especially a possibly vacant set of users;

the interaction between said automatic branch exchange and each user terminal being done as a function of the user terminal profile of said user terminal.

In other words, among the attributes of each terminal profile, there is, in particular, a set of users which, when it is not vacant, comprises one or more users capable of using the terminal.

Advantageously, each user terminal profile furthermore comprises at least one additional attribute belonging to the group comprising the modes of programming the keys of the user terminal keyboards.

This list is not exhaustive. In general, the profiles of the terminals comprise attributes that are not included in the profiles of the users.

The invention also relates to an automatic branch exchange, of the type interacting with a plurality of users by means of a plurality of user terminals, comprising:

means for the identification of each of said users by at least one user identifier, and means for the creation of a table of users, associating a user profile with said at least one user identifier of each user, each user profile comprising at least one attribute assigned to said user and especially a possible vacant set of user terminals, the interaction between said automatic branch exchange and each user being obtained as a function of the user profile associated with said user.

Other features and advantages of the invention shall appear from the following description of a preferred embodiment of the invention, given by way of a non-restrictive example and from the appended drawings.

DETAILED DESCRIPTION

The present invention relates to a method for the management of an automatic branch exchange comprising a step for the identification of each of the users by at least one user identifier, as well as a step for the creation of a table of users, associating a user profile with the user identifier (or user identifiers) of each user.

The invention also relates to an automatic branch exchange comprising the means needed for the implementation of the above-mentioned method.

The table of users introduced by the invention is essential since it is according to the contents of this table that the automatic branch exchange interacts with the users, and, more specifically, as a function of the user profile of these users that it interacts with them.

Each user profile comprises the attribute or attributes assigned to one of the users. It is possible to provide for a dynamic modification of the user profiles by a manager of the automatic branch exchange or even by the users themselves. With a view to simplification, the modification may consist of a choice of a user profile from a group of at least two predefined user profiles.

Figure 2:
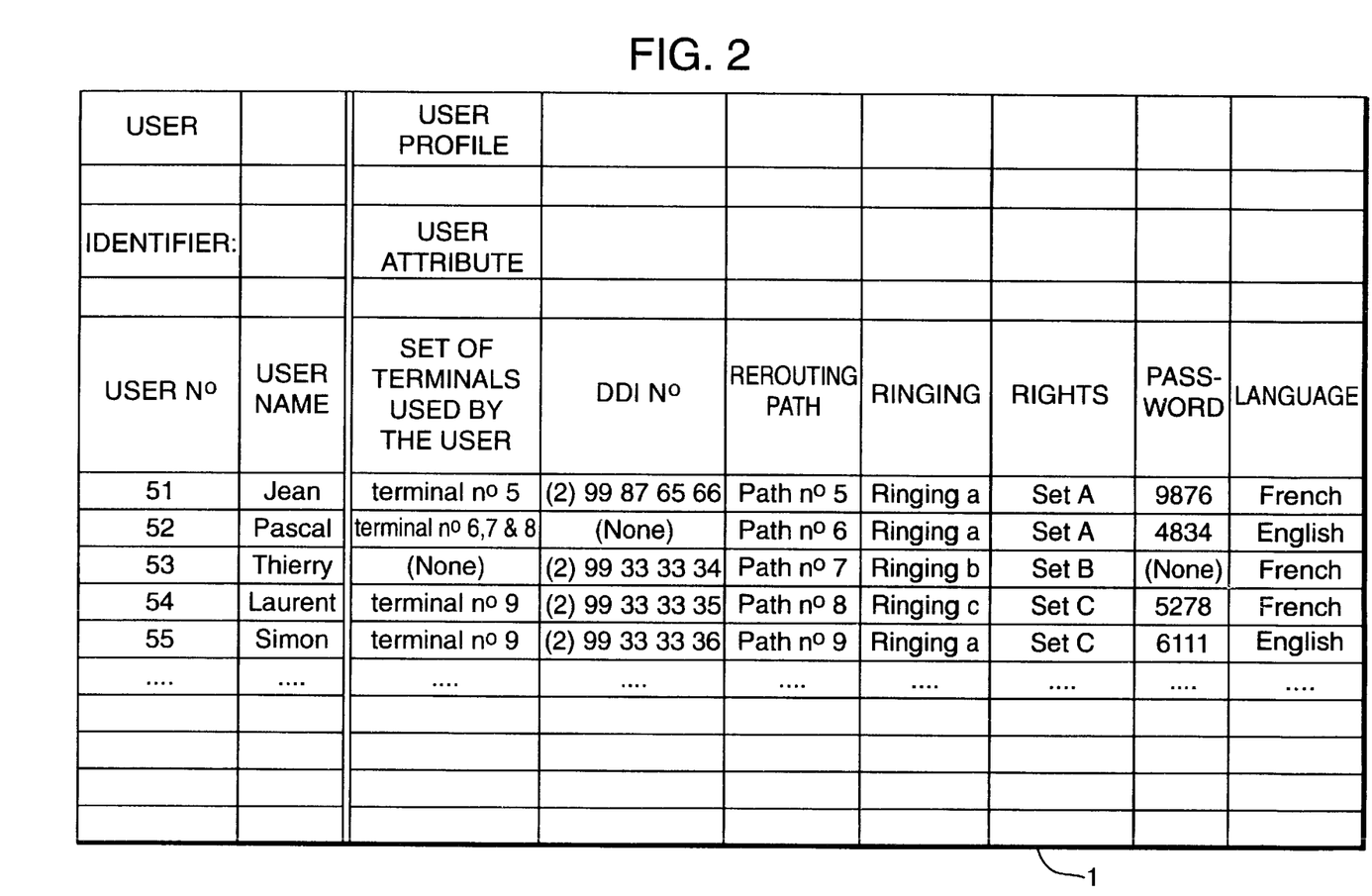
FIG. 2 shows an exemplary table of users created with a method for the management of an automatic branch exchange according to the invention.

Referring to FIG. 2, we shall now present an exemplary table of users 1 created by means of a method for the management of an automatic branch exchange according to the invention.

In this example, each user is identified by a pair of identifiers of the type (user number, user name) such as (51, Jean), (52, Pascal), (53, Thierry etc.).

Furthermore, in this example, each user profile comprises the following attributes:

- a set of user terminals, comprising the terminal(s) on which the user may be called. It is important to note that this set of terminals may possibly be vacant;
- a set of DDI numbers, comprising zero, one or a plurality of DDI numbers assigned to the user;
- a rerouting path, which may possibly be of a conditional type, a set of ringings, each ringing corresponding for example to a distinct tune that the user can easily recognize;
- a set of rights, the sets possibly being vacant (the notion of <<rights>> is explained in greater detail here below);
- if necessary, a password that the user must enter, for example through the keyboard of a terminal, in order that the automatic branch exchange may authenticate it;
- a language, for example, French or English, in which the automatic branch exchange must communicate with the user through the use of terminals available to the user (according to his user profile). It is assumed in this case that the terminals have a multilingual man-machine interface (display screens, voice synthesis, etc.).

The term user's rights refers to all types of authorization as well as rejection of certain actions requested by the user from the automatic branch exchange, for example permission to program forwarding operations to an external destination. These rights may vary from one user to another. There may be additional restrictions on rights depending on the terminal from which a user's request is made. For example a call coming in by a line may require a special login procedure to access certain services. However, these very same services could be offered directly at an internal station.

This invention is in no way limited to this exemplary profile but can be applied more generally to all types of profiles, whatever the attributes used.

Depending on the number of terminals included in the user profile of each user, a distinction is made between different types of users. These different types of users are presented briefly here below.

The term <<standard user>> designates a user whose profile, in the attribute <<set of user terminals>>, includes only one user terminal. In the example illustrated, it is the case of the user Jean whose profile includes the terminal No. 5.

The term <<multiple user>> designates a user whose profile, in the attribute <<set of user terminals>> includes at least two user terminals. In the example illustrated, it is the case of the user Pascal whose profile includes the terminals Nos. 6, 7 and 8. It will be noted that the profile of a multiple user furthermore comprises other attributes which, while they concern the operation of the terminals (this is, for example, the case with ringing), can be applied to all the terminals included in the profile of this user. In order to distribute a call intended for a multiple user, the automatic branch exchange implements a predetermined strategy for the distribution of calls among the different terminals included in the profile of this multiple user. Different call distribution strategies can be envisaged such as, especially but not exclusively, simultaneous distribution (all the terminals ring at the same time), cyclical distribution (the terminals ring successively, always in the same cycle), pseudo-cyclical sequential distribution (the terminals ring successively, but always according to the same cycle), cumulative distribution (a first terminal rings, then a first as well as a second, then a first and a second as well as a third etc.).

The term <<virtual user>> refers to a user whose profile, in the attribute <<set of user terminals>> includes no user terminal. The example illustrated refers to the case of the user Thierry. It will be noted that the profile of a virtual user such as Thierry comprises other <<non-vacant>> attributes such as a DDI number, a rerouting path, etc. enabling him to have certain resources of the system available to him.

The term <<common users>> refers to at least two users whose respective profiles include, in the attribute <<set of user terminals>>, at least one and the same user terminal. The example illustrated refers to the case of the users, Laurent and Simon, whose respective profiles comprise the terminal No. 9. In other words, the terminal No. 9 is a terminal <<shared>> between two users. It will be noted that the users differ with respect to the automatic branch exchange by their user identifiers. However, in order to avoid any confusion between common users during operation (for example during a call on the shared terminal), their profiles differ in at least one attribute, called a <<differentiation attribute>>, such as the ringing and/or the rerouting path and/or another attribute etc.

The application to the <<multi-telephonist>> function flows directly from this possibility of having available a terminal <<shared>> by several users. Indeed each user, through his own user profile, continues to have a customized use of this terminal. Thus, in the example illustrated, a telephonist working with the terminal No. 9 (secretariat) may carry out the customized management of the calls intended for the users Laurent and Simon with, especially, an automatic rerouting to distinct message systems if the user is absent.

In a particular embodiment, the present invention also provides for a step to identify each of the user terminals by at least one user terminal identifier, as well as a step for the creation of a table of user terminals.

The automatic branch exchange interacts with each terminal as a function of the contents of the table of terminals and, more specifically, as a function of the terminal profile associated with this terminal.

Each terminal profile comprises the attribute(s) assigned to one of the terminals.

Figure 3:
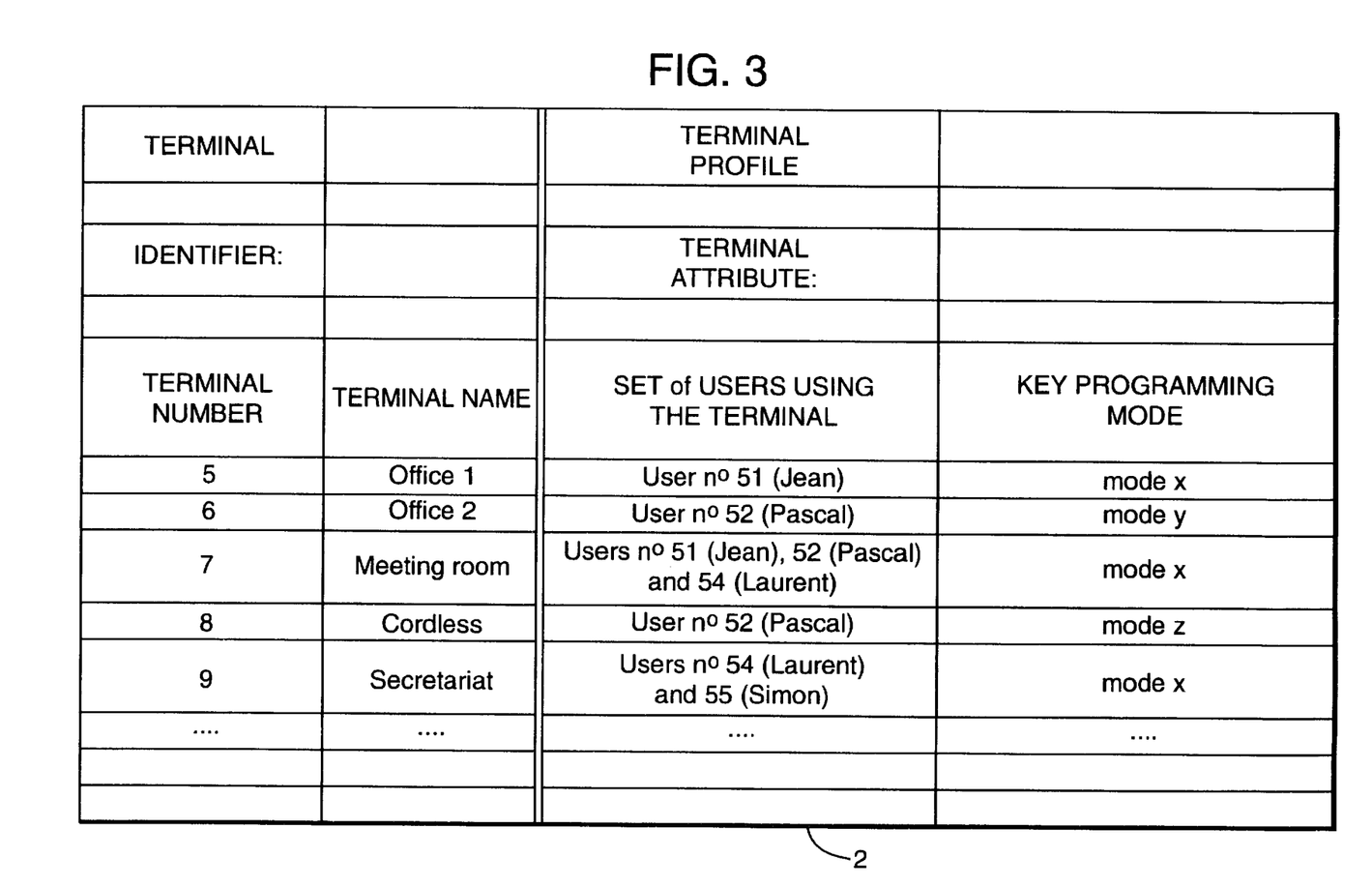
FIG. 3 shows an exemplary table of terminals created with a method for the management of an automatic branch exchange according to the invention.

An example shall now be presented, with reference to FIG. 3, of a table 2 of terminals created with a method for the management of an automatic branch exchange according to the invention. The table of terminals according to the invention makes a clear distinction between the notions of terminal and user, unlike the prior art table of terminals which deliberately identifies them with each other (and is therefore, for this reason, loosely called a <<table of users>>).

In this example, each user is identified by a pair of identifiers of the type (user number, user name) such as (51, Office 1), (52, Office 2), (53, Meeting Room) etc. It will be noted that, in this example, each terminal name corresponds to the geographical location of this terminal (office, room, secretariat . . . ) or to the nature of the terminal (for example 'cordless').

Furthermore, in this example, each user profile comprises the following attributes:

- a set of user terminals, comprising the terminal(s) on which the user may be called. It is important to note that this set of terminals may possibly be vacant;
- a key programming mode for the keyboard of this terminal.

In the example illustrated, the terminal No. 5 (office 1) is capable of being used by the user No. 51 (Jean). The terminal No. 7 (meeting room) is capable of being used by the users No. 51 (Jean), 52 (Pascal) and 54 (Laurent).

Thus, if someone uses a terminal, it is assumed (by the automatic branch exchange) to be one of the predetermined users listed in the terminal profile associated with this terminal. It will be recalled that each user is furthermore associated with a user profile comprising different attributes assigned to the user (and not to the terminal).

There can be no user associated with a terminal (in the terminal profile, the set of users is vacant). In this case, a call sent from this terminal is presented to the called party as a call coming from the terminal and not from a user in particular. The identifier of the caller is, for example, the name and/or the number of the terminal (not to be mistaken for a user name and/or number).

If there is only one user associated with the terminal, then he/she is considered, for example, to be the caller (although this is not compulsory).

Finally, if there are several users associated with one and the same terminal, it is necessary, after the phone has been picked up, either to consider that it is not known who the caller is (the situation is then reduced to one where no user is identified) or to have a procedure enabling the user to declare himself as a user (this procedure may range from the simple selection of his name by a menu to a login procedure requiring the entry of a personal code or PIN), or to have a procedure for the automatic declaration by the user (one of the associated users is, for example, considered to be the most probable user).

Figure 4:
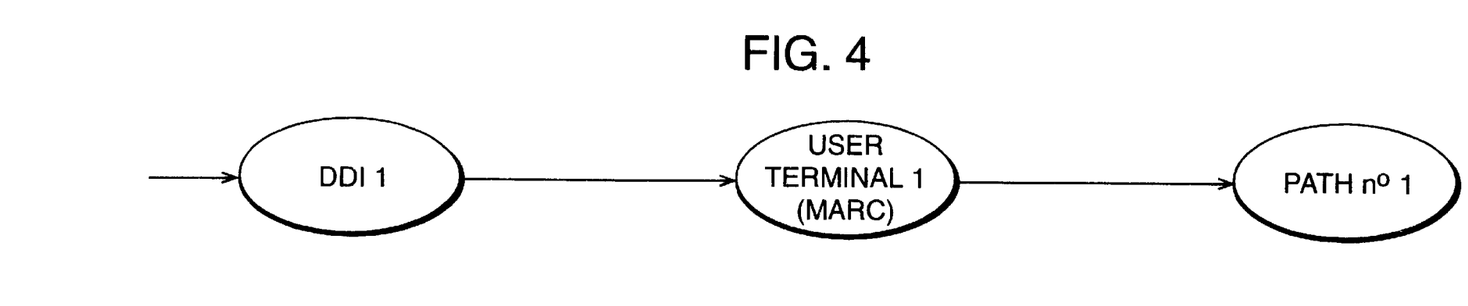
FIG. 4 shows an example of operation of the prior art method in the case of a <<standard user>>.
Figure 5:
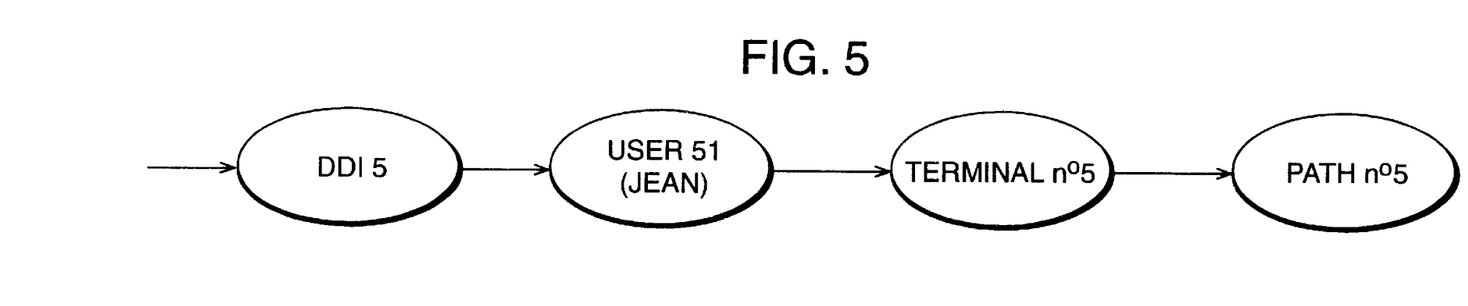
FIGS. 5 to 8 each show an example of operation of the method of the invention in the case especially of a <<standard user>>, a <<virtual user>>, a <<multiple user>> and a <<multi-telephonist>>.
Figure 6:
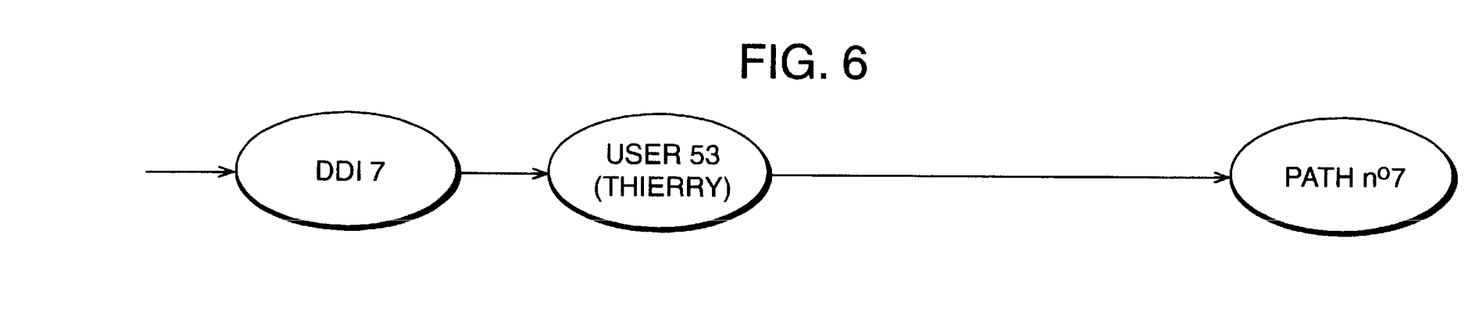
Figure 7:
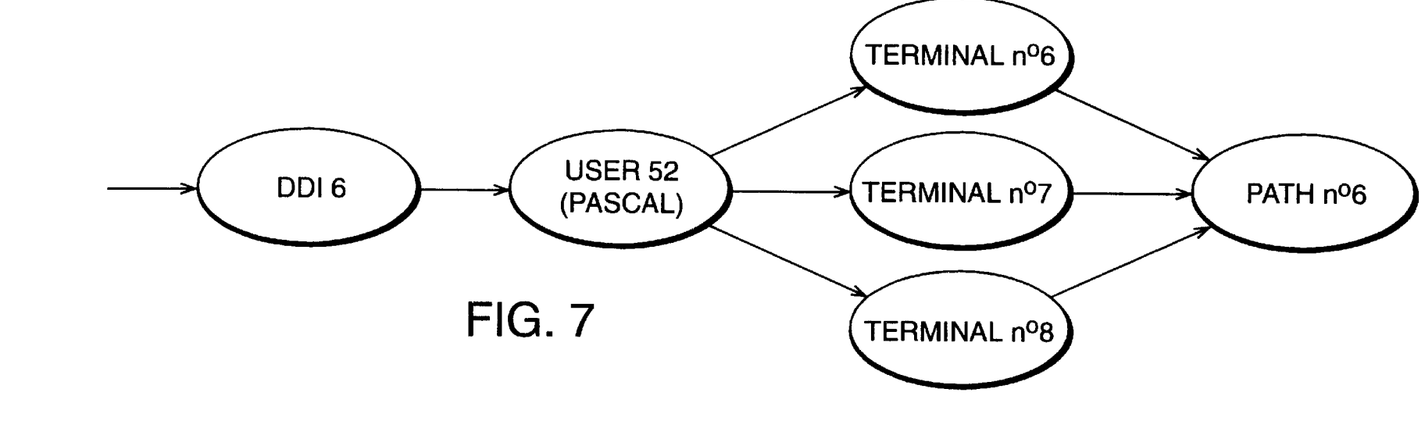
Figure 8:
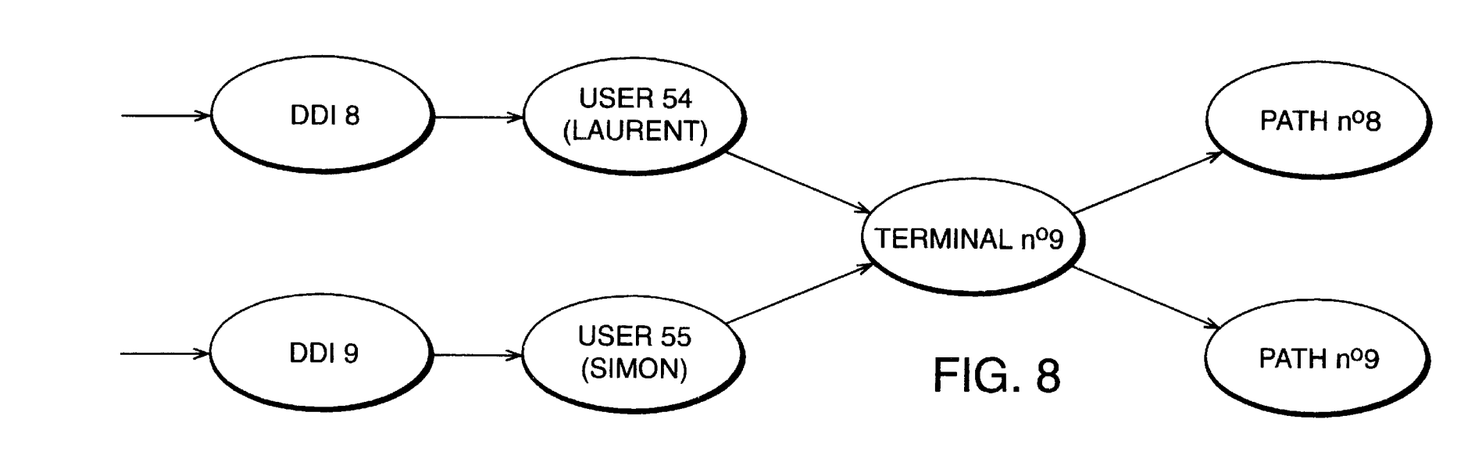

FIG. 4 shows an exemplary operation of the prior art method in the case of a "standard user". It is assumed that the call reaches the DDI number 1. The call is then directed towards the user-terminal No. 1 (the two notions being identified here), then rerouted along the path No. 1 if no one takes the call.

Referring to FIGS. 5 to 8, several examples are now given of the operation of the method according to the invention, in case respectively of a "standard user", "virtual user" and "multi-telephonist".

In the case of a standard user (FIG. 5), it is assumed that the call reaches the DDI number 5. The automatic branch exchange recognizes that this DDI number is assigned to the user No. 51 (Jean). It then directs the call to the terminal No. 5 which, according to the user table 1, is assigned to this user 51. If no one takes the call, it is rerouted along the path No. 5 which, according to the user table 1, is assigned to the user No. 51.

In the case of a virtual user (FIG. 6), it is assumed that the call reaches the DDI 7. The automatic branch exchange recognizes that this DDI number is assigned to the user No. 53 (Thierry). According to the user table 1, it is known that this user has no terminal available to it. It therefore directly reroutes the call along the path 7 which, according to the user table 1, is assigned to the user No. 53.

In the case of a multiple user (FIG. 7), it is assumed that the call reaches the DDI No. 6. The automatic branch exchange recognizes that this DDI number is assigned to the user No. 52 (Pascal). It then directs the call towards the terminals Nos. 6, 7 and 8 which, according to the user table No. 1, are assigned to this user No. 52. If no one takes the call, it is rerouted along the path No. 6 which, according to the user table No. 1, is assigned to the user No. 52.

In the case of common users (FIG. 8), it is assumed that the call reaches either the DDI number 8 or the DDI number 9. Depending on the DDI number concerned, the automatic branch exchange recognizes the fact that this DDI number is assigned to the user No. 54 (Laurent) or to the user No. 55 (Simon). In both cases, it then directs the call to the terminal No. 9 which, according to the user table No. 1, is assigned to these two users 54 and 55. If no one takes the call in the case of a call intended for the user No. 54, the call is rerouted along the path No. 8 which, according to the user table No. 1, is assigned to the user No. 54. If no one takes the call in the case of a call intended for the user No. 55, the call is rerouted along the path No. 9 which, according to the user table 1, is assigned to the user No. 55.

Of course, various changes and modifications to the illustrative embodiment described above will be apparent to those skilled in the art. Such changes and modifications can be made without departing from the spirit and the scope of the invention and without diminishing its attendant advantages. It is therefore intended that such changes and modifications be covered by the following claims, except insofar as limited by the prior art.

What is claimed is:

1. A method for management of an automatic branch exchange of a type interacting with a plurality of users by means of a plurality of user terminals, characterized in that the method comprises the following steps:

identification of each of said users by at least one user identifier;

creation of a table of users, associating a user profile with said at least one user identifier of each said user, each said user profile comprising at least one attribute assigned to said user, each said user profile comprising at a minimum a set that identifies user terminals which set is possibly vacant; and interaction between said automatic branch exchange and each said user taking place as a function of the user profile associated with said user, said user belonging to a group comprising:

"standard users" (51) whose profile includes a set of user terminals comprising a single user terminal (terminal No. 5);

"multiple users" (52) whose profile includes a set of user terminals comprising at least two user terminals (terminals Nos. 6, 7 and 8); and "virtual users" (53) whose profile includes a vacant set of user terminals, namely a set comprising no user terminal.

2. The method according, to claim 1, characterized in that said automatic branch exchange is a private automatic branch exchange.

3. The method according to claim 1, characterized in that each user profile furthermore comprises at least one additional attribute belonging to a group comprising:

sets of DDI numbers, which may possibly be vacant sets;

rerouting paths, which may possibly be of a conditional type;

sets of rings, which may possibly be vacant sets;

sets of rights, which may possibly be vacant sets;

passwords enabling an authentication; and languages usable by said automatic branch exchange.

4. The method according to claim 1, characterized in that the at least one user identifier belongs to a group comprising user numbers user names.

5. The method according to claim 1 characterized in that, for each call intended for one of said multiple users (52), said automatic branch exchange implements a predetermined call distribution strategy, enabling distribution of said call among said at least two user terminals ((terminals Nos. 6, 7 and 8) belonging to said set of user terminals included in the profile associated with said multiple use.

6. The method according to claim 5 characterized in that said predetermined call distribution strategy belongs to a group comprising:

simultaneous distribution;

cyclical distribution, pseudo-cyclical sequential distribution, cumulative distribution.

7. The method according to claim 1, characterized in that one and the same user terminal is a shared terminal (terminal No. 9) that may be included in different sets of user terminals, themselves included in at least two user profiles whose associated users are called <<common users>> (54, 55).

8. The method according to claim 7 characterized in that the user profile of each of said common users (54, 55) comprises at least one distinct differentiation attribute.

9. The method according to claim 8 characterized in that said at least one differentiation attribute belongs to a group comprising:

the user identifiers;

ringing; and rerouting paths.

10. The method according to claim 1, characterized in that it furthermore comprises a step of dynamic modification of said user profile.

11. The method according to claim 10, characterized in that said step of dynamic modification of said user profile is done through a function accessible to at least one person belonging to a group comprising:

a user associated with the user profile;

managers of said automatic branch exchange.

12. The method according to claim 11, characterized in that said step of dynamic modification of said user profile consists of a choice of a user profile from a group of at least two predefined user profiles.

13. The method according to claim 1, characterized in that said method furthermore comprises the following steps:

identification of each of said user terminals by at least one user terminal identifier; and creation of a table of user terminals (2), associating a user terminal profile with said at least one user terminal identifier of each user terminal, each user terminal profile comprising at least one attribute assigned to said user terminal and especially a possibly vacant set of users; and interaction between said automatic branch exchange and each user terminal being done as a function of the user terminal profile of said user terminal.

14. The method according to claim 13 characterized in that each user terminal profile furthermore comprises at least one additional attribute belonging to a group comprising:

a key programming mode of keyboards of the user terminals.

15. Automatic branch exchange, of a type interacting with a plurality of users by means of a plurality of user terminals, comprising:

means for identification of each of said users by at least one user identifier; and means for creation of a table of users, associating a user profile with said at least one user identifier of each said user, each said user profile comprising at least one attribute assigned to said user, each said user profile comprising at a minimum a set that identifies user terminals which set is possibly vacant; such that interaction between said automatic branch exchange and each said user is obtained as a function of the user profile associated with said user, said user belonging to a group comprising:

"standard users" (51) whose profile includes a set of user terminals comprising a single user terminal (terminal No. 5);

"multiple users" (52) whose profile includes a set of user terminals comprising at least two user terminals (terminals Nos. 6, 7 and 8); and "virtual users" (53) whose profile includes a vacant set of user terminals, namely a set comprising no user terminal.

16. An apparatus that effects the steps of any one of claims 1–4 or 5–14.

17. The method of claim 1 further comprising the step of:

creation of a table of said user terminals, associating a terminal profile with each said terminal, each said terminal profile comprising at least one attribute assigned to said terminal; wherein the step of interaction comprises the step of interaction between said automatic branch exchange and each said user terminal being done as a function of the terminal profile of said user terminal.

18. The method of claim 17 wherein:

the steps of interaction between said automatic branch exchange and each said user, and interaction between said automatic branch exchange and each said user terminal together comprise the step of interaction between said automatic branch exchange and a said user taking place by means of a said user terminal as a function of the user profile of said user and the terminal profile of said user terminal.

19. The method of claim 17 wherein:

the set of each said user profile identifies the user terminals, if any, on which the user may be contacted.

20. The automatic branch exchange of claim 15 further comprising:

a table of said user terminals, associating a terminal profile with each said terminal, each said terminal profile comprising at least one attribute assigned to said terminal; such that interaction between said automatic branch exchange and each said user terminal is obtained as a function of the terminal profile of said user terminal.

21. The automatic branch exchange of claim 20 such that:

interaction between said automatic branch exchange and a said user is obtained at a said user terminal as a function of the user profile of said user and the terminal profile of said user terminal.

22. The automatic branch exchange of claim 20 wherein:

the set of each said user profile identifies the user terminals, if any, on which the user may be contacted.

* * * * *